United States Patent [19]

Grego et al.

[11] Patent Number: 5,215,147
[45] Date of Patent: Jun. 1, 1993

[54] METHOD FOR SELECTIVELY CLOSING AN INTERMEDIATE ZONE OF A NEAR WELLBORE AREA

[75] Inventors: Leonard V. Grego, Bakersfield, Calif.; Ricky C. Ng, Dallas, Tex.; Craig H. Phelps, Bakersfield, Calif.

[73] Assignee: Mobil Oil Corporation, Fairfax, Va.

[21] Appl. No.: 810,587

[22] Filed: Dec. 19, 1991

[51] Int. Cl.$^5$ ................. E21B 33/138; E21B 43/24
[52] U.S. Cl. ........................... 166/270; 166/272; 166/302; 166/295
[58] Field of Search ............ 166/270, 272, 287, 288, 166/302, 312, 295

[56] References Cited

U.S. PATENT DOCUMENTS

| | | | |
|---|---|---|---|
| 3,070,163 | 12/1962 | Colar et al. | 166/295 |
| 3,918,521 | 11/1975 | Snavely, Jr. et al. | 166/272 |
| 4,034,811 | 7/1977 | Sparlin et al. | 166/295 |
| 4,091,868 | 5/1978 | Kozlowski et al. | 166/295 X |
| 4,275,788 | 6/1981 | Sweatman | 166/295 X |
| 4,339,000 | 7/1982 | Cronmiller | 166/295 |
| 4,489,783 | 12/1984 | Shu | 166/272 |
| 4,819,727 | 4/1989 | Jennings, Jr. | 166/295 X |
| 4,848,464 | 7/1989 | Jennings, Jr. et al. | 166/270 |
| 4,856,586 | 8/1989 | Phelps et al. | 166/270 |
| 4,940,091 | 7/1990 | Shu et al. | 166/270 |
| 4,972,906 | 11/1990 | McDaniel | 166/276 |
| 5,002,127 | 3/1991 | Dalarymple et al. | 166/295 |
| 5,090,478 | 2/1992 | Summers | 166/295 X |

Primary Examiner—George A. Suchfield
Attorney, Agent, or Firm—A. J. McKillop; G. W. Hager; C. A. Malone

[57] ABSTRACT

A method for selectively closing an intermediate zone of a near wellbore area in a formation. Initially, a drillable mechanical packer is placed into the wellbore below the intermediate zone. The wellbore area adjacent to the intermediate zone is cooled to a critical temperature between about 130° to about 180° F. Subsequently, a novolac or resole-type phenolformaldehyde resin containing an acid catalyst is placed into the wellbore where it forms a solid platform over the packer and intermediate zone in about 2 hours. The critical temperature is maintained in the wellbore and intermediate zone while placing a second resinous material containing an alkaline catalyst into the wellbore and intermediate zone. Thereafter, the second material forms a steam resistant solid gel in the intermediate zone, thereby closing it.

11 Claims, 1 Drawing Sheet

METHOD FOR SELECTIVELY CLOSING AN INTERMEDIATE ZONE OF A NEAR WELLBORE AREA

FIELD OF THE INVENTION

This invention relates to the use of resins for profile control so increased amounts of hydrocarbonaceous fluids can be obtained from a lesser permeability zone in a formation.

BACKGROUND OF THE INVENTION

When hydrocarbon producing wells are drilled, initial hydrocarbon production is usually attained by natural drive mechanisms (water drive, solution gas, or gas cap, e.g.) which force the hydrocarbons into the producing wellbores. If a hydrocarbon reservoir lacks sufficient pore pressure (as imparted by natural drive), to allow natural pressure-driven production, artificial lift methods (pump or gas lift, e.g.) are used to produce the hydrocarbons.

As a large part of the reservoir energy may be spent during the initial (or "primary") production, it is frequently necessary to use secondary hydrocarbon production methods to produce the large quantities of hydrocarbons remaining in the reservoir. Steam-flooding is a widespread technique for recovering additional hydrocarbons and usually involves an entire oil or gas field. Steam is injected through certain injection wells selected based on a desired flood pattern, lithology, and geological deposition of the pay interval. Displaced oil is then produced into producing wells in the field.

Ability to displace oil from all the producing intervals in a hydrocarbon reservoir is limited by the lithological stratification of the reservoir. That is, there are variations in permeability which allow higher permeability zones to be swept with injected fluid first and leave a major part of the hydrocarbon saturation in lower permeability intervals in place. Continued injection of flooding fluid results in "breakthrough" at the producing wells at the high permeability intervals which renders continued injection of the flooding medium uneconomical.

Profile control has been used to prevent or correct "breakthrough" at high permeability intervals. Profile control involves using stable polymers to retard or, in some cases, block off the higher permeability intervals in a mature flood so that the flooding media is diverted to the lower permeability intervals. Field experience has indicated profile control can be used to enhance productivity from lower permeability intervals.

To impart profile control, specially developed polymers (such as copolymers and polysaccharides) are used to retard permeability of higher permeability intervals. However, permeability damage is imparted to the low permeability zone while the profile control material is being used to treat the high permeability interval(s).

One method where gels have been used for profile control is discussed in U.S. Pat. No. 4,848,464 which issued to Jennings, Jr. et al. on Jul. 18, 1989. As taught in that patent, a zone of lesser permeability was closed by injecting gel into a formation during profile control. A solidifiable gel containing a gel breaker was injected into the formation where it entered into a zone of lesser and a zone of greater permeability. Another solidifiable gel lacking a gel breaker was injected into the zone of greater permeability where it subsequently solidified. Gel contained in the zone of lesser permeability liquified thereby unblocking that zone. Afterwards, a water-flooding enhanced oil recovery method was directed into a zone of lesser permeability.

Another method where gels are used in profile control is discussed in U.S. Pat. No. 4,856,586 which issued to Phelps et al. on Aug. 15, 1989. In this method, a rehealable Xanthan biopolymer was combined with a cross-linked non-selective polyacrylamide polymer gel. The combined gel system was injected into a formation where the Xanthan biopolymer gel selectively entered a zone of lesser permeability carrying therewith said non-selected gel. Once in the formation's zone of greater permeability, the gel rehealed and formed a rigid gel with substantially better temperature stability.

Although the above-mentioned methods are satisfactory in certain applications, sometimes it is necessary to precisely place a gel within a location in a formation to obtain better profile control.

Therefore, what is needed is a profile control method where a high permeability zone can be closed to fluid flow with a great degree of accuracy while minimizing damage to a lower permeability zone.

SUMMARY OF THE INVENTION

This invention is directed to a method for selectively closing a near wellbore area within an intermediate zone of a formation. In the practice of this invention, a drillable mechanical packer is placed into the wellbore adjacent to the intermediate zone in a manner sufficient to contain a first viscous resinous material in the wellbore for placement into the intermediate zone. Thereafter, the wellbore and intermediate zone adjacent thereto are allowed to obtain a temperature between about 130° to about 180° F. Afterwards, a first resin containing a mineral acid catalyst is placed into the wellbore on said packer.

This resinous material hardens within a substantially shortened time period so as to form a solid platform in said well and intermediate zone sufficient to support another column of resinous material thereabove for entry into the intermediate zone. Subsequently, a second resinous material containing an alkaline catalyst is placed over the solid platform whereupon it enters the near wellbore area and the intermediate zone. Here it forms a solid plastic with equal or better resistance to a steam-flooding operation than the first resinous material which was used to form the platform. Once the second resin has hardened to form the solid plastic, a steam-flooding operation is initiated in a zone of lesser permeability so as to remove hydrocarbonaceous fluids therefrom.

It is therefore an object of this invention to make a platform with a fast reacting resin within a wellbore so as to support a second slower forming resin with similar strength characteristics.

It is another object of this invention to provide a critical temperature range within which to carry out the creation of a solid resin platform and support another resin thereabove.

It is still another object of this invention to use a xylene and surfactant mixture to improve gravel pack wettability so as to cause resins to flow more efficiently into said gravel pack.

It is yet still another object of this invention to use a mineral acid catalyst with a phenolformaldehyde resin to make a fast-acting settable resinous platform.

It is a still even further object of this invention to use an alkaline catalyst with a phenolformaldehyde resin to make a second solid plastic supported by a first resinous platform.

BRIEF DESCRIPTION OF THE PREFERRED EMBODIMENTS

Figure 1:
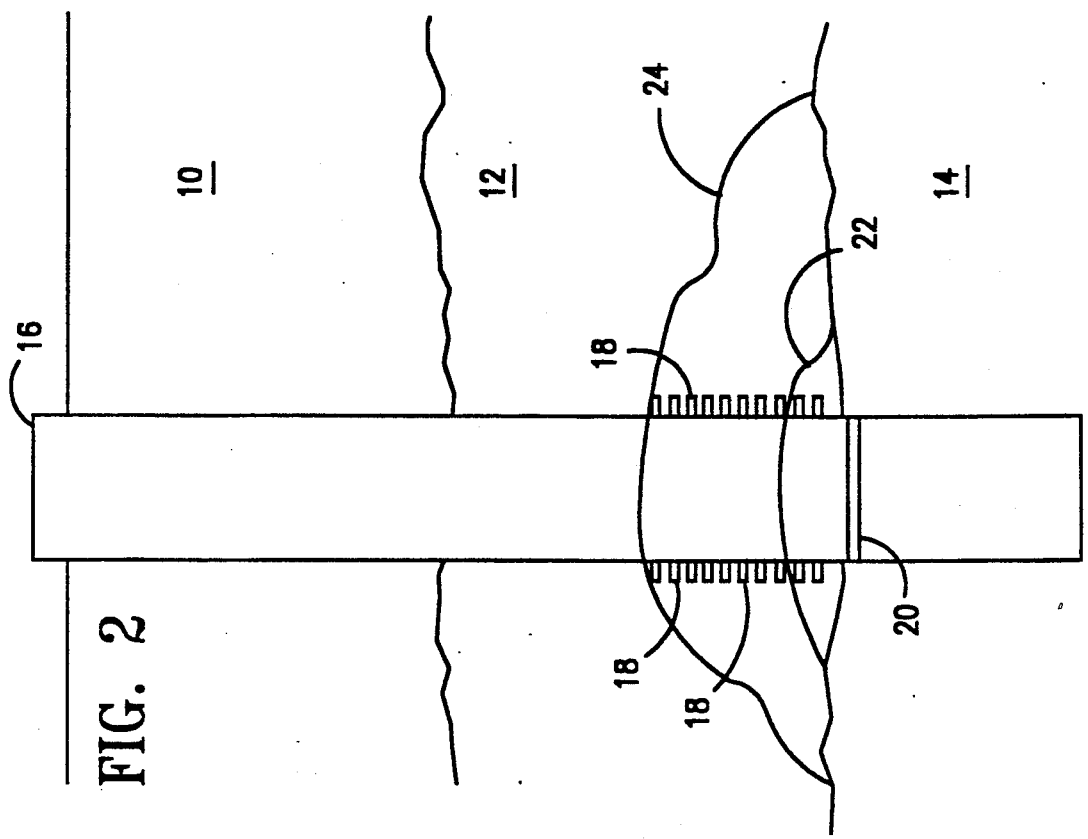
FIG. 1 is a schematic representation of a wellbore containing a drillable mechanical packer wherein a solid resinous bridge has been formed in said wellbore and intermediate area adjacent thereto.

In the practice of this invention, referring to FIG. 1, a first gellable resinous composition containing a mineral acid catalyst therein is injected into wellbore 16 which penetrates formation 10. The wellbore contains a drillable mechanical packer 20. This drillable mechanical packer is set below intermediate zone 12. Intermediate zone 12 contains two additional zones. Zone 10 lies above intermediate zone 12 and zone 14 lies below intermediate zone 12. Hydrocarbonaceous fluids have been substantially removed from intermediate zone 12 by a steam-flooding operation. Intermediate zone 12 contains perforations 18 which have penetrated into and are in fluid communication with wellbore 16.

Because intermediate zone 12 and wellbore 16 have been subjected to a steam-flooding operation, the temperature is considerably above 200° F. Before commencing the injection of the first resinous material containing an acid catalyst therein, the wellbore and intermediate zone are cooled to a temperature between about 130° and 180° F. The wellbore and intermediate zone can be cooled by injecting water into wellbore 16 so as to cool wellbore and the intermediate zone 12. It is necessary to cool intermediate zone and wellbore to a temperature between about 130° and 180° F. because this temperature is critical to allowing about 10–20 minutes of flow time for the resin to penetrate the intermediate zone 12 through the perforations (or gravel pack). The temperature range and the acid concentration also provides for a fast reacting resin so that the resin would not have enough time to flow downward into producing zone 14. Although not shown, wellbore 12 can contain a gravel pack adjacent to intermediate zone 12. As known by those skilled in the art, the gravel pack is used to control the production of fines or sand from the formation when producing hydrocarbonaceous fluids therefrom.

One method for placing the resinous material into the formation is by use of a positive displacement dump bailer. This is a mechanical device, symmetrical in shape, which is filled with a mixture of resinous material and acid catalyst. It is lowered into wellbore 16 by a cable. The bailer is positioned at the desired depth above the packer and when activated, releases a metal bar in the top of the device. The bar falls downward inside the device and impacts the top of the fluid creating a downward-moving shock wave which travels through the fluid column contained in the bailer. The shock wave causes a shearing of metal pins in the bottom of the bailer and a subsequent downward movement of the small piston. This small piston uncovers ports to allow a release of the resinous material. The bar continues to fall through the bailer as fluid is released through the ports. The weight of the metal bar effectively adds to the weight of the fluid column being dumped. As the bar falls to the bottom of the bailer, the cylindrical bailer is wiped clean of the resinous material containing the acid catalyst.

Other types of positive displacement dump bailers, which operate in a similar manner, may also be used. It is possible to deliver the resinous viscous material with catalyst therein in an open gravity-feed dump bailer. This is a bailer which is open at the top and closed at the bottom. When activated, the bottom cover, which is held by metal pins, is sheared by an explosive or by other means so as to open the bottom. Opening the bottom allows the resinous viscous material with catalyst therein to flow by gravity from the bottom of the bailer and into intermediate zone 12.

A coiled tubing may also be used to place the viscous resinous material at intermediate zone 12. The coiled tubing consists of a one-inch or other small pipe which is wound on a spool at the surface of well 16. The viscous resinous material and catalyst therein are placed in the end of the tubing and held in place by wiper balls at the top and at the bottom of the resinous material. The tubing is then uncoiled and lowered into well 16 above packer 20. Thereafter, the viscous resinous material with catalyst therein is pressured through the tubing and released into intermediate zone 12. Here it forms a solid platform in wellbore 16 and intermediate zone 12. As is shown in FIG. 1, the resinous material enters intermediate zone 12 via perforations 18. Because the resinous material with catalyst therein is fast acting, a solid platform 22 is formed in wellbore 16 and intermediate zone 12. This material, of course, is held in place by packer 20. The viscous material is injected into intermediate zone 12 until it has formed a column of about 2 feet in wellbore 16. The material is allowed to harden and thereafter, a second solidifiable resinous material is placed thereabove.

Figure 2:
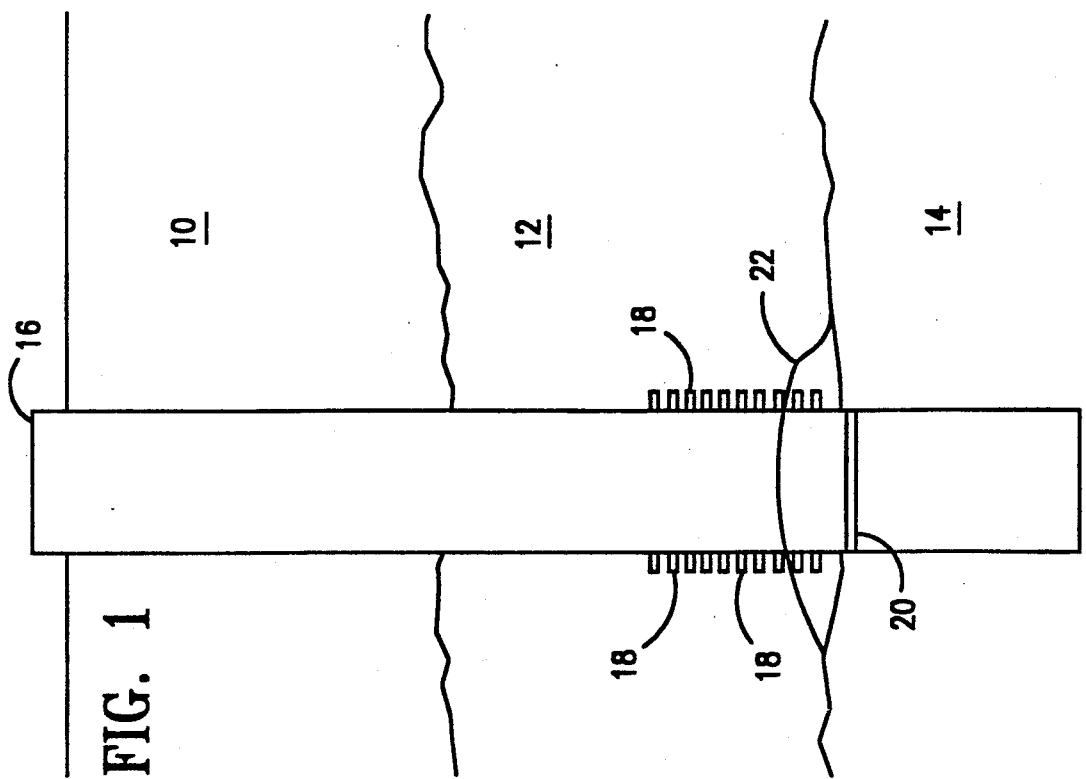
FIG. 2 schematically represents a wellbore containing a drillable mechanical packer with a solid platform thereabove which supports a second resinous gel material.

A second viscous material is placed above platform 22 and contains a viscous resinous material with an alkaline catalyst therein. The alkaline catalyst causes the viscous gelable material to form a gel (or plastic) more slowly. The resultant gel which forms is similar in strength to the gel which was used for platform 22. Also, this gel is more resistive to steam-flooding than the gel which formed platform 22. The second gel is placed into the wellbore above platform 22 by use of a dump bailer as was used in conjunction with placement of the first viscous material into wellbore 16. The second viscous material is placed into wellbore 16 adjacent to intermediate zone 12 until it has reached a height above perforations 18. This is shown in FIG. 2. The second resinous material is allowed to remain in wellbore 16 above perforations 18 in intermediate zone 12 for a time sufficient to form a solid gel 24. As preferred, it will remain in intermediate zone 12 for about 24 hours. This solid gel will be about 10 or more feet so as to close off perforations 18 in wellbore 16. Of course, this height will vary depending on the height of the intermediate zone desired to be closed from fluid flow.

Once the solid gel 24 has formed, a steam-flooding operation can be commenced in upper level 10. If desired, packer 20 can be drilled out along with solid resinous material contained in wellbore 16 and a steam-flooding operation can be commenced in lower zone 14.

The amount of resinous material used to form the platform 22 and the second solid gel 24 depends on the size of the intermediate zone desired to be closed off, the height of the wellbore above packer, and whether a gravel pack is contained in the wellbore. Usually, the amount of resinous material used will be between about 0.5 and 4.0 gallons per foot of interval desired to be plugged. Since the amount of viscous material which a bailer or coiled tubing can deliver in a single operation is limited, it may be necessary to carry out the delivery process in two or more stages. It is important during this procedure to maintain the wellbore and areas to be closed off with the resinous material at a temperature of about 130° to about 180° F. To accomplish this, it may be necessary to dump about 100 to 300 barrels of filtered formation water into the well to maintain low wellbore temperature for a few hours. The wellbore temperature must be monitored at regular intervals during the placement of the resinous materials into the wellbore formation.

When a gravel pack is present within wellbore 16, the wetting characteristic can be changed by injection of a solution of xylene and a surfactant through said pack. The resinous material tends to flow easier into an oil-wet gravel pack than a water-wet one. The xylene solvent can also be used to clean the gravel pack of any asphaltenes which may be deposited in the gravels or in the wells which have been produced for a substantially long period of time.

The preferred resin for use herein comprises a novolac resin or a resole-type phenolformaldehyde resin. These resins are mentioned in U.S. Pat. No. 4,972,906 which issued to MacDaniel on Nov. 27, 1990. This patent is hereby incorporated by reference herein. In order to make a first fast acting resinous material, a mineral acid, preferably hydrochloric acid, is used as the catalyst in combination with a novolac or resole-type phenolformaldehyde resin. If a novolac resin is used, an additional formaldehyde-based crosslinking agent is added to the resinous material. This makes a fast-acting gel which hardens in a substantially short period of time. The concentration and volume of acid utilized must be customized according to the temperature of the well right before the dump-bailing operation. This allows the resin to have about ten to about twenty minutes of flow time and to gel in about 30 to about 60 minutes. Before placing additional resinous material into the formation, it is best to wait for about one-half to about one hour to allow the resin to harden. The first batch of resinous material is usually about 18 gallons. It plugs the bottom of the treated intermediate zone 12.

When making the second resinous material, an alkaline catalyst is used. As is preferred, the alkaline catalyst comprises potassium hydroxide. As mentioned previously, the amount of alkaline catalyst utilized will depend upon the area of a formation which is to be treated, and the temperature of the intermediate area and wellbore prior to dump-bailing. The resinous material which subsequently forms a second solid gel will form in about 24 to 48 hours. Use of the alkaline catalyst substantially strengthens the cured resin.

In order to thin the novalac resin or resole-type phenolformaldehyde resin, a five weight percent solution of isopropyl alcohol is utilized. Use of this concentration of solvent allows for efficient draining of the dump-bailer or for speeding up resin penetration into gravel packs. It has also been determined that it is best to use a resin which is substantially fresh. Freshness can be determined by a measurement of the resinous viscosity. If the viscosity is over a recommended tolerance limit, it should be rejected. The preferred viscosity range is about 1,000 to 10,000 centipoise @ 75° F. A simple, rugged capillary viscometer is available to measure the viscosity obtained. This viscometer can be obtained from Baxter Scientific Products.

Where desired, a steam-flooding process can be initiated in either the upper or lower zones of the formation. Steam-flood processes which can be used when employing the procedure described herein are detailed in U.S. Pat. Nos. 4,489,783 and 3,918,521 which issued to Shu and Snavely, respectively. These patents are hereby incorporated by reference herein. Of course, for any such situation, the viscous material which is utilized, either in the platform or as a second gel must be capable of withstanding steam temperatures.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed:

1. A method for selectively closing a near wellbore area in an intermediate zone of a formation comprising:
   a) placing a drillable packer into said wellbore adjacent to the intermediate zone in a manner sufficient to contain a first viscous resinous material in the wellbore for placement into said zone;
   b) allowing the wellbore and intermediate zone to obtain a temperature between about 130° to about 180° F;
   c) placing into the wellbore on said packer, a first resinous material containing a mineral acid catalyst which hardens within a substantially shortened time period so as to form a solid platform sufficient to support a column of resin thereabove for entry into said intermediate zone; and
   d) placing a second resinous material containing an alkaline catalyst over said solid platform which resin enters the near wellbore area of the intermediate zone where it forms a solid gel resistant to a steam-flooding operation.

2. The method as recited in claim 1 where a steam-flooding enhanced oil recovery operation is initiated in the formation after step d).

3. The method as recited in claim 1 where said first and second resinous material are resole resins.

4. The method as recited in claim 1 where solid resinous material formed by the resinous material in steps c) and d) is removed from the wellbore and the packer is drilled out to allow fluid communication with a lower zone of the formation.

5. The method as recited in claim 1 where solid resinous material is removed from the wellbore and the packer is drilled out to allow a steam-flooding enhanced oil operation to be conducted in lower zones of the formation.

6. The method as recited in claim 1 where the first resinous material forms a solid platform in less than about 2 hours.

7. The method as recited in claim 1 where said second resinous material forms in about 24 to about 48 hours.

8. The method as recited in claim 1 where the acid catalyst comprises hydrochloric acid.

9. The method as recited in claim 1 where the alkaline catalyst comprises potassium hydroxide.

10. The method as recited in claim 1 where the platform is about 2 feet in height.

11. The method as recited in claim 1 where the wellbore contains a gravel pack which is flushed with xylene and a surfactant after step b).

* * * * *